Aug. 8, 1967   I. BONIC   3,334,939
COMBINATION SNOW SHOVEL AND SCRAPER
Filed Aug. 27, 1965
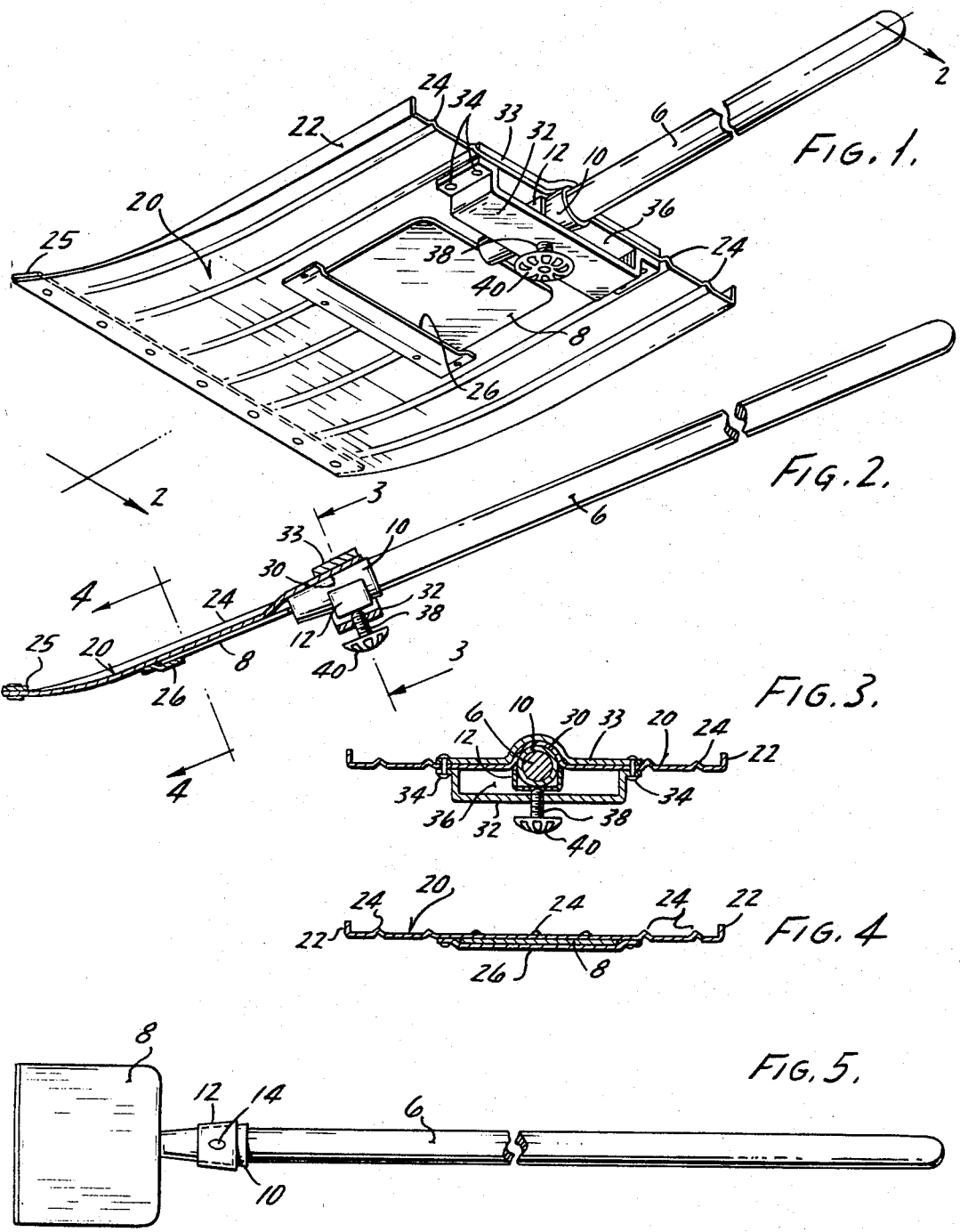
INVENTOR.
ISAAC BONIC
BY
Wheeler, Wheeler & Wheeler
ATTORNEYS.

United States Patent Office 3,334,939
Patented Aug. 8, 1967

3,334,939
COMBINATION SNOW SHOVEL AND SCRAPER
Isaac Bonic, 3000 N. 54th St., Milwaukee, Wis. 53210
Filed Aug. 27, 1965, Ser. No. 483,090
2 Claims. (Cl. 294—51)

ABSTRACT OF THE DISCLOSURE

A combined shovel and scraper having a handle carrying a scraping blade at one end thereof, a shovel blade having a pocket on its lower surface for housing said scraping blade and means carried on the lower surface of said shovel blade for securing said shovel blade to said handle and retaining said scraping blade in said pocket.

This invention relates to a combination snow shovel and scraper.

The scraper comprises a relatively small scraping blade with a permanently attached handle. There is preferably a ferrule on the handle at the point of its connection with the blade. A shovel blade which is preferably somewhat concave in its longitudinal dimension has a pocket in which the scraper blade is detachably receivable and it has a bracket of such dimensions that the scraper blade may be inverted through the bracket into the pocket, the bracket being designed for close fitting engagement with the ferrule of the scraper blade handle and provided with a setscrew for engaging the ferrule of the scraper blade handle. The ferrule and setscrew preferably have complementary locking portions so that the setscrew, when engaged, will securely hold the handle to the shovel blade to enable the shovel to function as if it were permanently attached to the handle. A head of substantial size is preferably provided on the setscrew for ease in operation.

When the parts are assembled, the scraper blade desirably lies substantially in face contact with the under surface of the shovel blade and provides substantial reinforcement therefor and is in a position in which it projects substantially in the plane of the handle. The parts can be disassembled readily and virtually instantaneously either for the purpose of enabling the scraper to be used independently or for the purpose of facilitating storage of the parts in limited space, as in an automobile trunk.

In the drawings:

FIG. 1 is a view in perspective showing the complete tool as assemblied for use as a shovel.

FIG. 2 is a view taken in section on line 2—2 of FIG. 1, the handle and scraper blade being shown in side elevation and the shovel and its socket being shown in section.

FIG. 3 is a view taken in transverse section through the handle on the line 3—3 of FIG. 2.

FIG. 4 is a view taken in section on the line 4—4 of FIG. 2.

FIG. 5 is a plan view of the scraper.

The scraper per se comprises an elongated handle 6 provided at its end with a generally conventional flat rectangular scraper blade 8. The handle is desirably provided with a ferrule 10 encircling its end adjacent the blade and into which the blade tang is received. The construction being conventional, the tang is not illustrated.

For cooperation with the shovel blade as hereinafter described, the ferrule 10 is either built up by a setscrew-seat member 12 as shown in FIG. 3, or it may have a pocket 14 as shown in FIG. 5, the purpose in either case being to provide a surface with which a retaining setscrew on the shovel will be engaged.

The shovel blade 20 may be of any desired size. In the preferred practice of the invention, it is contemplated that it be somewhat narrower than some snow shovel blades. It preferably has upturned margins at 22 which may extend substantially from the midpoints of its respective side margins toward its rear end, the object being primarily the reinforcement of the blade. For the same reason, the ribs 24 are optionally provided, particularly if the blade is made of some reltaively lightweight aluminum alloy. If the blade is made of steel, these may be unnecessary. Similarly the top surface of the front edge of the blade will normally be reinforced by a steel strip at 25, if the blade is made of aluminum.

About midway of the length of the blade, a shallow pocket 26 is provided. This pocket is attached to the blade at its sides and bottom and is dimensioned to receive with close fit the blade 8 of the scraper. The scraper blade thus is held in substantial face contact with the under surface of the shovel blade 20 to provide very substantial reinforcement for the latter.

The shovel blade preferably is either curved slightly upwardly, at least, toward its rear margin 28, to overlie the ferrule 10 of the scraper blade end, or, desirably, the shovel blade has a channel at 30 in which the ferrule 10 is received to resist any relative lateral displacement between the rear end of the shovel blade and the handle 6. This channel is spanned by a bridge member or yoke 32 which is relatively heavy and is riveted or otherwise permanently fixed at 34 to the shovel blade. The same rivets 34 which hold the yoke 32 may conveniently be used to hold to the blade a reinforcing bar 33 on the face of the blade opposite the yoke. The space 36 between the bridge member and the shovel blade is as wide as the scraper blade 8 to permit the scraper blade to be readily introduced into and withdrawn through the space 36 as the scraper blade is moved to and from engagement in its pocket 26.

The bridge member carries a strong setscrew 38 with a relatively large head 40 so that it may be tightly engaged with the ferrule 10 when the latter is positioned in the opposing channel portion 30 of the shovel blade.

The fitting 12 welded to the ferrule, or the recess 14 integrally formed therein, will, in either case, provide surfaces with which the tightened setscrew 38 will be in interlocking engagement to secure the parts firmly in assembly. It will be noted, with particular reference to FIG. 2, that in the assembled position of the parts the shovel blade 20 projects nearly in the axial plane of the handle, but preferably has a slight concavity such as is commonly provided in snow shovel design.

The construction is such that the assembly of the shovel blades of the scraper handle will be unusually secure for usage but the parts may be instantly and easily disassembled by releasing the setscrew and withdrawing the scraper blade 8 from the pocket 26 through the slot provided at 36 between the bridge member 32 and the shovel blade. This enables the scraper to be withdrawn readily for separate use or for separate storage of the scraper and shovel blade in limited space.

I claim:

1. A combined scraper and shovel comprising the combination with a scraper blade having a scraping edge at one end and a handle connected to its other end and extending from the blade substantially in the plane of the blade, a ferrule on the handle adjacent the scraper blade, a shovel blade, pocket-forming means on the under surface of the shovel blade in which the scraper blade is detachably engaged and in which said edge is housed, the pocket-forming means being closely fitted to the sides and to the scraping edge of the scraper blade, whereby to hold the scraper blade against lateral movement and to provide a limit to its movement in one direction longitudinally of said handle, the scraper blade being movable in an opposite direction longitudinally of the handle from a position of engagement in said means, the scraper blade when so engaged being substantially in face contact with the under surface of the shovel blade, and means connecting the shovel blade with the handle and for holding the scraper blade and handle from movement in a direction to disengage the scraper blade from said connecting means, said last means comprising a yoke connected with the shovel blade and having a portion spaced beneath the shovel blade for a distance sufficient to accommodate movement of the scraper blade therethrough, and the shovel blade having a downwardly opening channel in which the ferrule is releasably engaged against lateral displacement, the yoke having a setscrew substantially at right angles to the shovel blade and for which said ferrule is provided with a seat, the setscrew having a large head constituting a handle for manipulation without tools.

2. A combined scraper and shovel according to claim 1 in which the shovel blade has a reinforcing bar on its upper face opposite the yoke and spanning said channel in conformity with the shovel blade.

References Cited
UNITED STATES PATENTS

| | | | |
|---|---|---|---|
| 1,107,583 | 8/1914 | Burchell | 294—51 |
| 1,319,306 | 10/1919 | Rogers | 294—51 |
| 1,369,262 | 2/1921 | Olsen | 294—51 |
| 1,885,089 | 10/1932 | Dukes | 7—12 |

WILLIAM FELDMAN, *Primary Examiner.*

R. V. PARKER, *Assistant Examiner.*